United States Patent
Ni et al.

(10) Patent No.: US 10,846,124 B2
(45) Date of Patent: Nov. 24, 2020

(54) COMMUNICATION METHOD, APPARATUS AND SYSTEM FOR VIRTUAL MACHINE AND HOST MACHINE

(71) Applicant: BEIJING BAIDU NETCOM SCIENCE AND TECHNOLOGY CO., LTD., Beijing (CN)

(72) Inventors: Xun Ni, Beijing (CN); Yongji Xie, Beijing (CN); Yu Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 114 days.

(21) Appl. No.: 16/351,272

(22) Filed: Mar. 12, 2019

(65) Prior Publication Data

US 2019/0377593 A1    Dec. 12, 2019

(30) Foreign Application Priority Data

Jun. 12, 2018    (CN) .......................... 2018 1 0600242

(51) Int. Cl.
*G06F 9/44*    (2018.01)
*G06F 9/455*    (2018.01)
*G06F 9/54*    (2006.01)

(52) U.S. Cl.
CPC .......... *G06F 9/45558* (2013.01); *G06F 9/544* (2013.01); *G06F 9/546* (2013.01); *G06F 2009/45579* (2013.01); *G06F 2009/45583* (2013.01)

(58) Field of Classification Search
CPC ....................................................... G06F 9/44
See application file for complete search history.

(56) References Cited

U.S. PATENT DOCUMENTS

| 8,131,897 B2 * | 3/2012 | Kim ................... G06F 13/1663 710/66 |
| 9,535,798 B1 * | 1/2017 | Liguori ............... G06F 11/1438 |
| 2004/0068637 A1 * | 4/2004 | Nelson ................. G06F 3/0619 711/203 |

* cited by examiner

*Primary Examiner* — Jae U Jeon
(74) *Attorney, Agent, or Firm* — Seed IP Law Group LLP

(57) ABSTRACT

Embodiments of the present disclosure disclose a communication method, apparatus and system for a virtual machine and a host machine. An embodiment of the communication method for a virtual machine and a host machine includes: polling a first command completion identifier queue set in a shared memory; comparing, in response to detecting an update of the first command completion identifier queue, the first command completion identifier queue with a second command completion identifier queue stored in the virtual machine to determine an identifier of a currently completed command; and updating the second command completion identifier queue based on the identifier of the currently completed command.

9 Claims, 6 Drawing Sheets

COMMUNICATION METHOD, APPARATUS AND SYSTEM FOR VIRTUAL MACHINE AND HOST MACHINE

CROSS-REFERENCE TO RELATED APPLICATIONS

This application claims priority to Chinese Patent Application No. 201810600242.2, filed on Jun. 12, 2018, titled "Communication method, apparatus and system for virtual machine and host machine," which is hereby incorporated by reference in its entirety.

TECHNICAL FIELD

The present disclosure relates to the field of computer technology, specifically to the technical field of communication between a virtual machine and a host machine, and more specifically to a communication method, apparatus, and system for a virtual machine and a host machine.

BACKGROUND

Virtual machine refers to a complete computer system having the functionality of a complete hardware system, simulated through software and running in an entirely isolated environment.

Virtio is a protocol for handling the communication between programs in a virtual machine, and programs in a host machine. Specifically, a front-end program in the virtual machine receives a command and puts the corresponding command into vring in virtio first. Next, a backend program is notified for processing by the eventfd mechanism. Here, the eventfd mechanism is a mechanism that allows the kernel to communicate with a user mode application. The backend program receives the command sent from the front-end program through vring, and sends the command to the corresponding hardware to complete the processing. A result is returned to the front-end program through eventfd upon completing the processing.

When the communication between the front-end program in the virtual machine and the back-end program in the host machine is performed using virtio, vmentry/vmexit action is required. Here, vmentry refers to entry to the virtual machine from the host machine, and vmexit refers to the exit from the virtual machine to the host machine.

SUMMARY

Embodiments of the present disclosure provide a communication method, apparatus and system for a virtual machine and a host machine.

According to a first aspect, an embodiment of the present disclosure provides a communication method for a virtual machine and a host machine, including: polling a first command completion identifier queue set in a shared memory; comparing, in response to detecting an update of the first command completion identifier queue, the first command completion identifier queue with a second command completion identifier queue stored in the virtual machine to determine an identifier of a currently completed command; and updating the second command completion identifier queue based on the identifier of the currently completed command.

In some embodiments, the method further includes: sending an I/O port read and write request to a to-be-executed command queue, and updating a to-be-executed command identifier queue corresponding to the to-be-executed command queue, causing the host machine polling the to-be-executed command identifier queue to obtain a current to-be-executed command, and to update the first command completion identifier queue after the current to-be-executed command is executed.

In some embodiments, the method further includes: obtaining returned data corresponding to the currently completed command from a command queue based on the identifier of the currently completed command; and invoking a function to process the returned data.

According to a second aspect, an embodiment of the present disclosure further provides a communication system for a virtual machine and a host machine, including: a host machine and at least one virtual machine deployed on the host machine. For the at least one virtual machine, the virtual machine is configured to: poll a first command completion identifier queue set in a shared memory; compare, in response to detecting an update of the first command completion identifier queue, the first command completion identifier queue with a second command completion identifier queue stored in the virtual machine to determine an identifier of a currently completed command; and update the second command completion identifier queue based on the identifier of the currently completed command.

In some embodiments, the at least one virtual machine is further configured to: send an I/O port read and write request to a to-be-executed command queue, and update a to-be-executed command identifier queue corresponding to the to-be-executed command queue.

In some embodiments, the host machine is configured to: poll the to-be-executed command identifier queue in the shared memory; determine, in response to detecting an update of the to-be-executed command identifier queue, from the to-be-executed command queue the I/O port read and write request as a current to-be-executed command; send the current to-be-executed command to a hardware device to cause the hardware device to execute the current to-be-executed command; and add, in response to receiving a command execution completion message returned by the hardware device, returned data of the current to-be-executed command to a command completion queue, and update the first command completion identifier queue.

In some embodiments, the at least one virtual machine is further configured to: obtain returned data corresponding to the currently completed command from a command queue based on the identifier of the currently completed command; and invoke a function to process the returned data.

According to a third aspect, an embodiment of the present disclosure further provides a communication apparatus for a virtual machine and a host machine, including: a polling unit, configured to poll a first command completion identifier queue set in a shared memory; a determining unit, configured to compare, in response to detecting an update of the first command completion identifier queue, the first command completion identifier queue with a second command completion identifier queue stored in the virtual machine to determine an identifier of a currently completed command; and an updating unit, configured to update the second command completion identifier queue based on the identifier of the currently completed command.

In some embodiments, the apparatus further includes: a sending unit, configured to send an I/O port read and write request to a to-be-executed command queue, and update a to-be-executed command identifier queue corresponding to the to-be-executed command queue, causing the host machine polling the to-be-executed command identifier queue to obtain a current to-be-executed command, and to update the first command completion identifier queue after the current to-be-executed command is executed.

In some embodiments, the apparatus further includes: an obtaining unit, configured to obtain returned data corresponding to the currently completed command from a command queue based on the identifier of the currently completed command; and an invoking unit, configured to invoke a function to process the returned data.

According to a fourth aspect, an embodiment of the present disclosure further provides a server, provided with at least one virtual machine thereon, the server further includes: one or more processors; and a storage apparatus, storing one or more programs thereon, the one or more programs, when executed by the one or more processors, cause the one or more processors to implement the method according to the first aspect.

According to a fifth aspect, an embodiment of the present disclosure further provides a computer readable storage medium, storing a computer program thereon, the computer program, when executed by a processor, implements the method according to the first aspect.

The communication method, system and apparatus for a virtual machine and a host machine according to the embodiments of the present disclosure, first poll a first command completion identifier queue set in a shared memory, and then compare, in response to detecting an update of the first command completion identifier queue, the first command completion identifier queue with a second command completion identifier queue stored in the virtual machine to determine an identifier of a currently completed command, and finally update the second command completion identifier queue based on an identifier of the currently completed command. In this way, whether there is a new completed task may be determined by the active polling method, thus avoiding the system access delay caused by the initialization of a virtual environment when entering the virtual machine from the host machine through a vmentry instruction.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
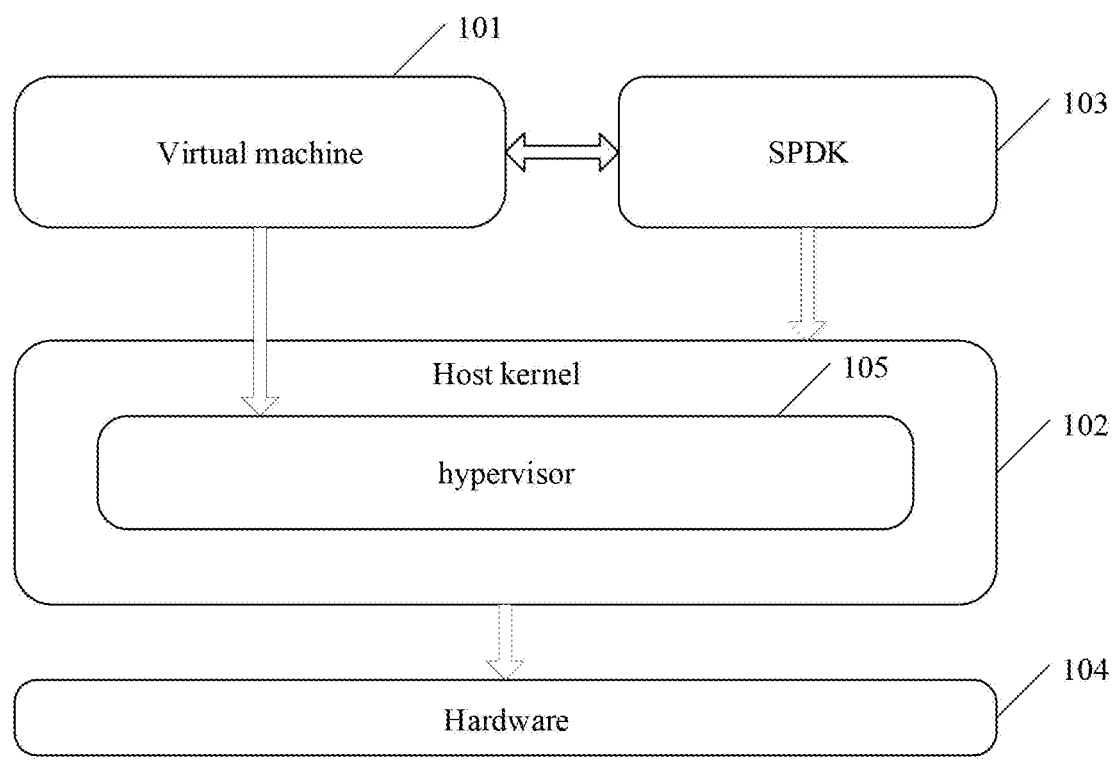
FIG. 1 is an exemplary system architecture diagram to which the present disclosure is applicable.

FIG. 1 shows an exemplary system architecture 100 in which an embodiment of a communication method for a virtual machine and a host machine or a communication apparatus for a virtual machine and a host machine of the present disclosure may be applied.

As shown in FIG. 1, the system architecture 100 may include a virtual machine (guest kernel) 101, a host kernel 102 on which the virtual machine is deployed, a Storage Performance Development Kit (SPDK) 103, and a host hardware 104. The host kernel 102 is further provided with a software layer hypervisor 105 for running between the host kernel 102 and the virtual machine 101. The hypervisor 105 may allow multiple virtual machines 101 and applications to share a set of underlying physical hardware, and thus may also be considered as a "meta" operating system in a virtual environment. In the present disclosure, the hypervisior 105 may be, for example, a Kernel Based Virtual Machine (KVM).

When the virtual machine 101 generates an I/O (input output) read and write request, the virtual machine 101 may interact with the SPDK 103 to send an I/O read and write command to the SPDK 103. After receiving the I/O read and write command, the SPDK 103 may send the I/O read and write command to the host hardware 104 through the I/O technology running in the user control to execute the I/O command, and feed back the execution result of the I/O command to the virtual machine 101.

It should be noted that the communication method for a virtual machine and a host machine according to the embodiments of the present disclosure is generally performed by the virtual machine 101. Accordingly, the communication apparatus for a virtual machine and a host machine may also be provided in the virtual machine 101.

It should be understood that the number of virtual machines 101 in FIG. 1 is merely illustrative. Any number of virtual machines 101 may be deployed on the same one host kernel 102 based on the requirements during implementing.

Figure 2:
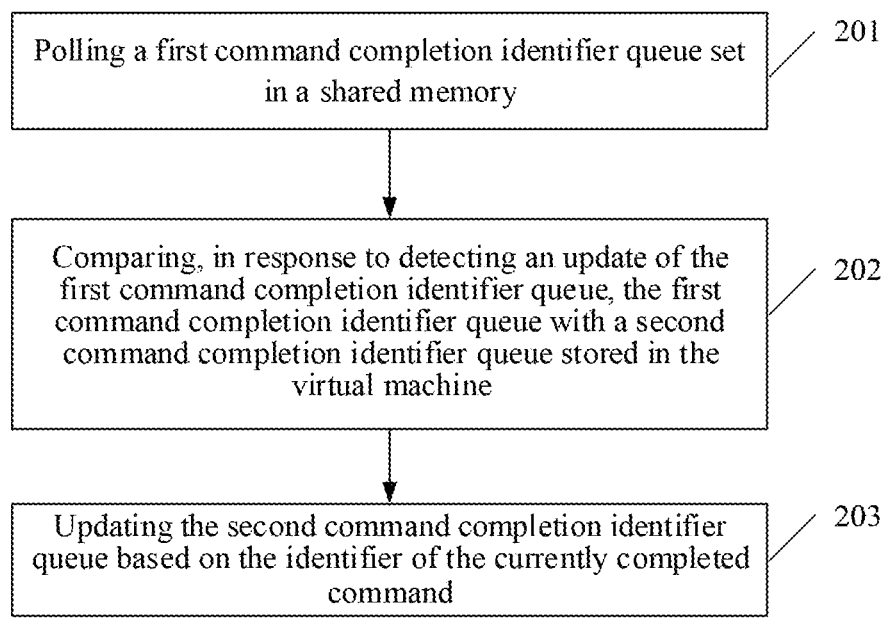
FIG. 2 is a schematic flowchart of an embodiment of a communication method for a virtual machine and a host machine according to the present disclosure.

Further, referring to FIG. 2, a flowchart 200 of an embodiment of a communication method for a virtual machine and a host machine according to the present disclosure is shown. The communication method for a virtual machine and a host includes the following steps.

Step 201, polling a first command completion identifier queue set in a shared memory.

The executing body (for example, the virtual machine 101 as shown in FIG. 1) of the communication method for a virtual machine and a host machine according to the present embodiment may poll a shared memory shared by the virtual machine and the SPDK.

Here, polling may be understood as a periodic inquiry. For example, the virtual machine may issue an inquiry to the shared memory at intervals, to obtain the set first command completion identifier queue in the shared memory. It may be understood that the interval between the moments when the virtual machine sends the inquiry twice, may be preset, or may be autonomously set and/or adjusted by the virtual machine based on the current state of the virtual machine.

The first command completion identifier queue stores an identifier of an I/O command that has been executed by the host hardware. In some application scenarios, whenever it is determined that there is a new completed I/O command executed by the host hardware, the SPDK may write the identifier of the I/O command into the first command completion identifier queue. For example, each time the SPDK receives an I/O command execution result fed back by the host hardware, it may be determined that the I/O command is completed by itself. At this point, the SPDK may update the first command completion identifier queue stored in the shared memory.

In this way, the virtual machine may obtain the current first command completion identifier queue at intervals by polling the first command completion identifier queue.

Step 202, comparing, in response to detecting an update of the first command completion identifier queue, the first command completion identifier queue with a second command completion identifier queue stored in the virtual machine to determine an identifier of a currently completed command.

In the present embodiment, the virtual machine side may also maintain a command completion identifier queue (i.e., a second command completion identifier queue). In this way, by comparing the first command completion identifier queue with the second command completion identifier queue, the difference between the two may be determined.

In some application scenarios, an initial first command completion identifier queue and an initial second command completion identifier queue may be completely identical during initialization. For example, the initial first command completion identifier queue and the initial second command completion identifier queue have the identical lengths and the contents stored therein are the same (e.g., both are empty).

In these application scenarios, a flag may be set for the first command completion identifier queue and the second command completion identifier queue respectively to indicate the locations of the tails of the queues. It may be understood that if the contents of both are empty after initialization, then at this time, the flag points to the head of the queue, namely: flag=0.

It may be understood that when the first I/O command is completed, the flag of the first command completion identifier queue will be updated to flag=1, and at this time, the flag of the second command completion identifier queue still points to the head of the queue, that is, flag=0. At this time, since the flag values of the two queues are different, the virtual machine may determine that there is an update of the first command completion identifier queue. At this time, the difference between the two flag values may be used to compare the first command completion identifier queue and the second completion identifier queue stored in the virtual machine, to thereby determine an identifier of a currently completed command in the first command completion identifier queue.

Specifically, by comparing the flag of the first command completion identifier queue and the flag of the second command completion identifier queue stored locally, the virtual machine may determine that the difference between the two flags is 1, that is, it may be determined that there is a currently completed command by performing the current polling.

Further, since the flag value of the second command completion identifier queue is 0, and the difference between the flag value of the first command completion identifier queue and the flag value of the second command completion identifier queue is 1, it may be determined that the identifier of the currently completed command is located at the second storage location in the first command completion identifier queue.

Step 203, updating the second command completion identifier queue based on the identifier of the currently completed command.

By the above step 202, the virtual machine may determine the location of the identifier corresponding to the currently completed command in the first command completion identifier queue. Then, in step 203, for example, the identifier of the currently completed command may be copied and stored in the head of the second command completion identifier queue, thereby completing the synchronization of the first command completion identifier queue and the second command completion identifier queue.

The communication method for a virtual machine and a host machine provided by the present embodiment first polls a first command completion identifier queue set in a shared memory, and then compares, in response to detecting an update of the first command completion identifier queue, the first command completion identifier queue with a second command completion identifier queue stored in the virtual machine to determine an identifier of a currently completed command, and finally updates the second command completion identifier queue based on an identifier of the currently completed command. In this way, whether there is a new completed task may be determined by the active polling method, thus avoiding the system access delay caused by the initialization of a virtual environment when entering the virtual machine from the host machine through a vmentry instruction.

Figure 3:
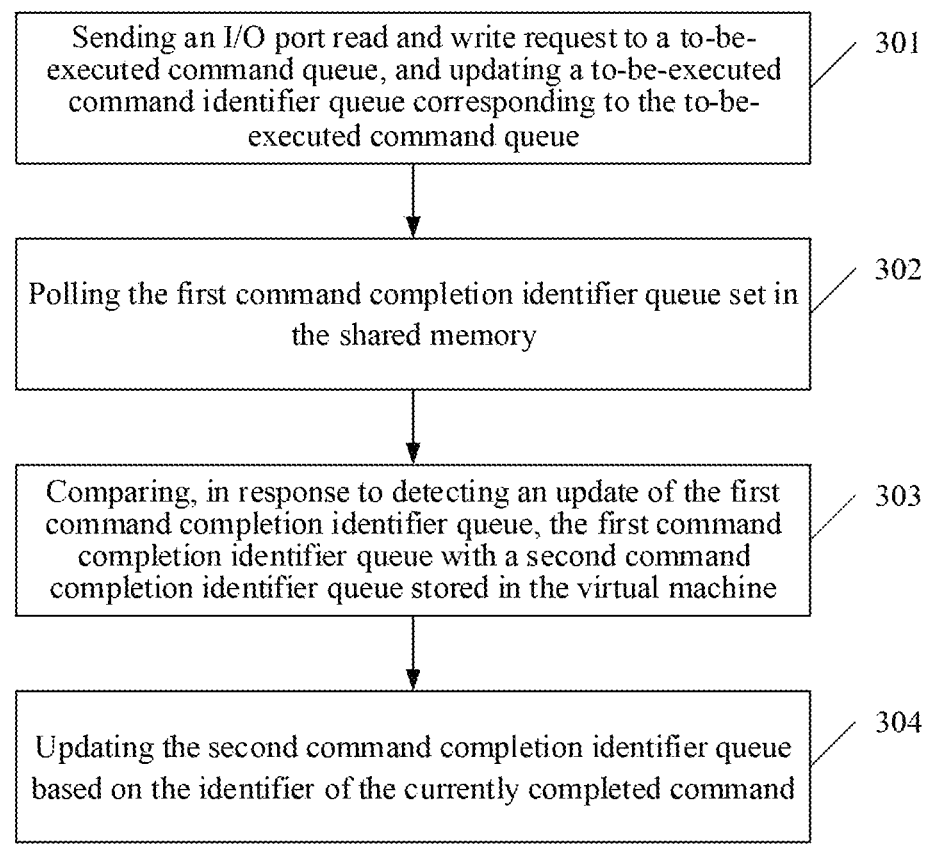
FIG. 3 is a schematic diagram of an application scenario of the communication method for a virtual machine and a host machine according to the present disclosure.

Referring to FIG. 3, a schematic flowchart of another embodiment of the communication method for a virtual machine and a host machine according to the present disclosure is shown.

The communication method for a virtual machine and a host according to the present embodiment includes the following steps.

Step 301, sending an input output (I/O) port read and write request to a to-be-executed command queue, and updating a to-be-executed command identifier queue corresponding to the to-be-executed command queue, causing the host machine polling the to-be-executed command identifier queue to obtain a current to-be-executed command, and to update a first command completion identifier queue after the current to-be-executed command is executed.

In the present embodiment, the executing body (for example, the virtual machine 101 as shown in FIG. 1) of the communication method for a virtual machine and a host machine may send an I/O port read and write request to the to-be-executed command queue when the I/O port needs to be accessed, and update the to-be-executed command identifier queue corresponding to the to-be-executed command queue.

In this way, the SPDK that polls the to-be-executed command identifier queue may actively learn whether a new to-be-executed command arrives. If it is detected that a new to-be-executed command arrives by means of polling, the SPDK may send the to-be-executed command to the host hardware. If the to-be-executed command is executed, then the SPDK may update the first command completion identifier queue.

Step 302, polling the first command completion identifier queue set in the shared memory.

Step 303, comparing, in response to detecting an update of the first command completion identifier queue, the first command completion identifier queue with a second command completion identifier queue stored in the virtual machine to determine an identifier of a currently completed command.

Step 304, updating the second command completion identifier queue based on the identifier of the currently completed command.

The aforementioned step 302 to step 304 in the present embodiment may be performed in a manner similar to the step 201 to step 203 in the embodiment as shown in FIG. 2, so the description will not be repeated here.

As compared to the method shown in FIG. 2, in the communication method for a virtual machine and a host machine in the present embodiment, when the I/O port read and write request is sent to the to-be-executed command queue, the to-be-executed command identifier queue corresponding to the to-be-executed command queue is updated, so that the SPDK polling the to-be-executed command identifier queue may actively learn the new current to-be-executed command, and send the current to-be-executed command to the host hardware for executing, which may prevent the field from being protected by the vmexit instruction when transiting from the virtual machine to the host machine, thereby further reducing the system access delay.

In addition, in some alternative implementations of the communication method for a virtual machine and a host machine according to the embodiments of the present disclosure, after determining the identifier of the currently completed command, the virtual machine may further obtain returned data corresponding to the currently completed command from a command queue based on the identifier of the currently completed command. In this way, the corresponding function may be invoked to process the returned data, thereby obtaining a desired processing result.

In addition, in some alternative implementations of the communication method for a virtual machine and a host machine according to the foregoing embodiments of the present disclosure, the first command completion identifier queue, the second command completion identifier queue, the to-be-executed command queue, and the to-be-executed command identifier queue, etc., may be circular queues. By setting the above queues as circular queues, the "false overflow" phenomenon of the queue may be avoided.

Figure 4:
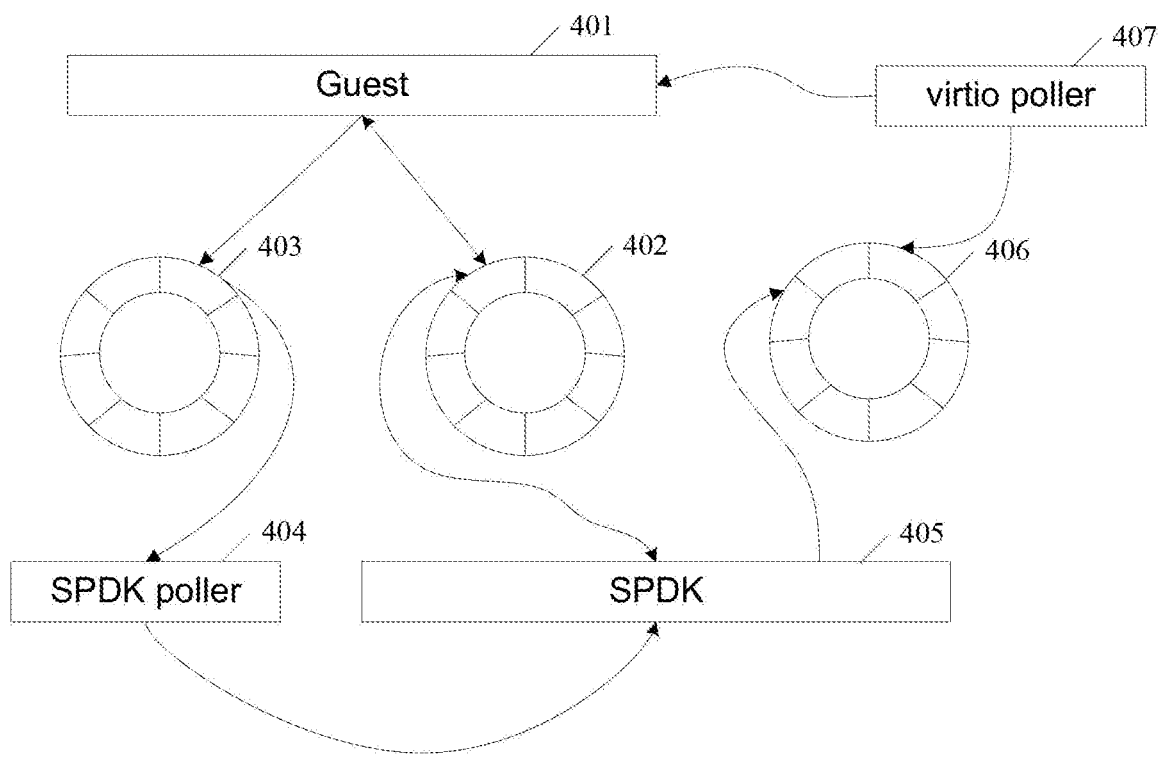
FIG. 4 is a schematic flowchart of another embodiment of the communication method for a virtual machine and a host machine according to the present disclosure.

Referring to FIG. 4, a schematic diagram of an application scenario of the communication method for a virtual machine and a host machine according to the present embodiment is shown.

In this application scenario, first, the virtual machine 401 generates an I/O read and write request, and sends the I/O command to the virtqueue queue 402 through the virtio protocol, and simultaneously updates the to-be-executed command identifier queue 403 of the virtqueue queue 402.

Then, the program SPDK poller 404 for polling the to-be-executed command identifier queue 403 in the SPDK, polls the to-be-executed command identifier queue 403 and compares the to-be-executed command identifier queue 403 with the to-be-executed command identifier queue stored locally in the SPDK, and when it is found that there is a new to-be-executed command, the SPDK poller 404 notifies the SPDK 405 to obtain the to-be-executed command from the virtqueue queue 402 and send the to-be-executed command to the host hardware for executing.

Next, if the execution of the command is completed, the SPDK 405 updates the virtqueue queue 402 and the first command completion identifier queue 406.

At the same time, the polling program virtio poller 407 at the virtual machine side finds there is a new completed command by polling the first command completion identifier queue 406, and comparing the first command completion identifier queue 406 with the second command completion identifier queue stored locally in the virtual machine, and then notifies the virtual machine to obtain returned data corresponding to the currently completed command from the virtqueue queue 402, and invoke a function to process the returned data.

It can be seen from the above process that the polling program SPDK poller 404 set at the SPDK side and the polling program virtio poller 407 set at the virtual machine side may respectively avoid the vmexit instruction and the vmentry instruction executed when entering the host machine from the virtual machine, so as to improve the I/O performance and reduce the system delay.

Figure 5:
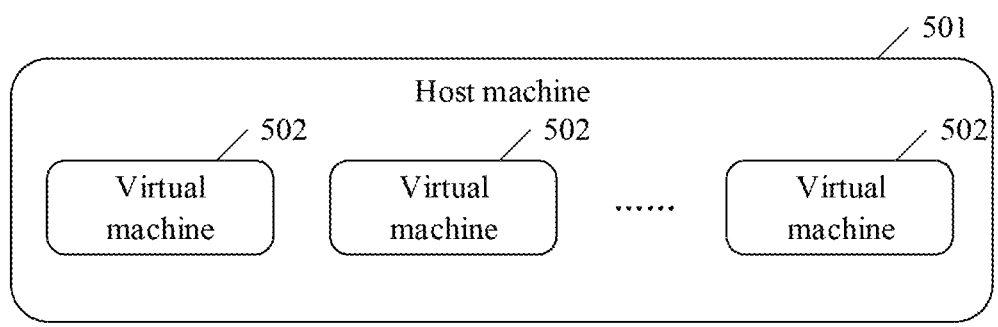
FIG. 5 is a structural diagram of an embodiment of a communication system for a virtual machine and a host machine according to the present disclosure.

Referring to FIG. 5, a communication system for a virtual machine and a host machine according to an embodiment of the present disclosure is shown.

The communication system for a virtual machine and a host machine as shown in FIG. 5 includes a host machine 501 and at least one virtual machine 502 deployed on the host machine 501.

For at least one of virtual machines in the communication system, the virtual machine may be configured to: poll a first command completion identifier queue set in a shared memory; compare, in response to detecting an update of the first command completion identifier queue, the first command completion identifier queue with a second command completion identifier queue stored in the virtual machine to determine an identifier of a currently completed command; and update the second command completion identifier queue based on the identifier of the currently completed command.

In this way, whether there is a new completed task may be determined by the active polling method, thus avoiding the system access delay caused by the initialization of a virtual environment when entering the virtual machine from the host machine through a vmentry instruction.

In some alternative implementations of the present embodiment, the at least one virtual machine may be further configured to: send an I/O port read and write request to a to-be-executed command queue, and update a to-be-executed command identifier queue corresponding to the to-be-executed command queue.

In some alternative implementations of the present embodiment, the host machine may be further configured to: poll the to-be-executed command identifier queue in the shared memory; determine, in response to detecting an update of the to-be-executed command identifier queue, from the to-be-executed command queue the I/O port read and write request as a current to-be-executed command; send the current to-be-executed command to a hardware device to cause the hardware device to execute the current to-be-executed command; and add, in response to receiving a command execution completion message returned by the hardware device, returned data of the current to-be-executed command to a command completion queue, and update the first command completion identifier queue.

In these alternative implementations, the host machine may actively poll the to-be-executed command identifier queue in the shared memory through the SPDK. If there is an update of the to-be-executed command identifier queue, the SPDK may determine from the to-be-executed command queue the I/O port read and write request sent by the virtual machine as the current to-be-executed command, and send the current to-be-executed command to the host hardware for executing. In this way, the SPDK polling the to-be-executed command identifier queue may actively learn the new current to-be-executed command, and send the current to-be-executed command to the host hardware for executing, which may prevent the field from being protected by the vmexit instruction when transiting from the virtual machine to the host machine, thereby further reducing the system access delay.

In some alternative implementations of the present embodiment, the at least one virtual machine is further configured to: obtain returned data corresponding to the currently completed command from a command queue based on the identifier of the currently completed command; and invoke a function to process the returned data.

It may be understood that, in the communication system for a virtual machine and a host machine in the present embodiment, the first command completion identifier queue, the second command completion identifier queue, the to-be-executed command queue, and the to-be-executed command identifier queues, etc., may be circular queues. By setting the above queues as circular queues, the "false overflow" phenomenon of the queue may be avoided.

Figure 6:
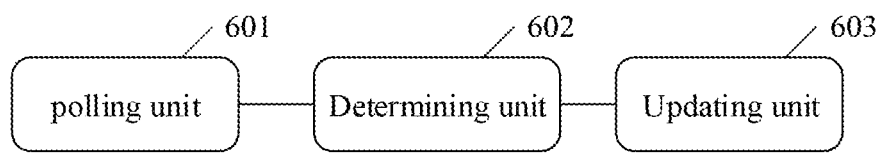
FIG. 6 is a structural diagram of an embodiment of a communication apparatus for a virtual machine and a host machine according to the present disclosure.

With further reference to FIG. 6, as an implementation of the method shown in the above figures, the present disclosure provides an embodiment of a communication apparatus for a virtual machine and a host machine. The embodiment of the apparatus corresponds to embodiment of the method shown in FIG. 2, and the apparatus may be applied to various electronic devices.

As shown in FIG. 6, the communication apparatus for a virtual machine and a host machine according to the present embodiment may include a polling unit 601, a determining unit 602, and an updating unit 603.

The polling unit 601 may be configured to poll a first command completion identifier queue set in a shared memory.

The determining unit 602 may be configured to compare, in response to detecting an update of the first command completion identifier queue, the first command completion identifier queue with a second command completion identifier queue stored in the virtual machine to determine an identifier of a currently completed command.

The updating unit 603 may be configured to update the second command completion identifier queue based on the identifier of the currently completed command.

In some alternative implementations, the communication apparatus for a virtual machine and a host machine in the present embodiment may further include a sending unit (not illustrated in the figure).

In these alternative implementations, the sending unit may be configured to send an I/O port read and write request to a to-be-executed command queue, and update a to-be-executed command identifier queue corresponding to the to-be-executed command queue, causing the host machine polling the to-be-executed command identifier queue to obtain a current to-be-executed command, and to update the first command completion identifier queue after the current to-be-executed command is executed.

In some alternative implementations, the communication apparatus for a virtual machine and a host machine in the present embodiment may further include an obtaining unit (not illustrated in the figure) and an invoking unit (not illustrated in the figure).

In these alternative implementations, the obtaining unit may be configured to obtain returned data corresponding to the currently completed command from a command queue based on the identifier of the currently completed command.

The invoking unit may be configured to invoke a function to process the returned data.

Figure 7:
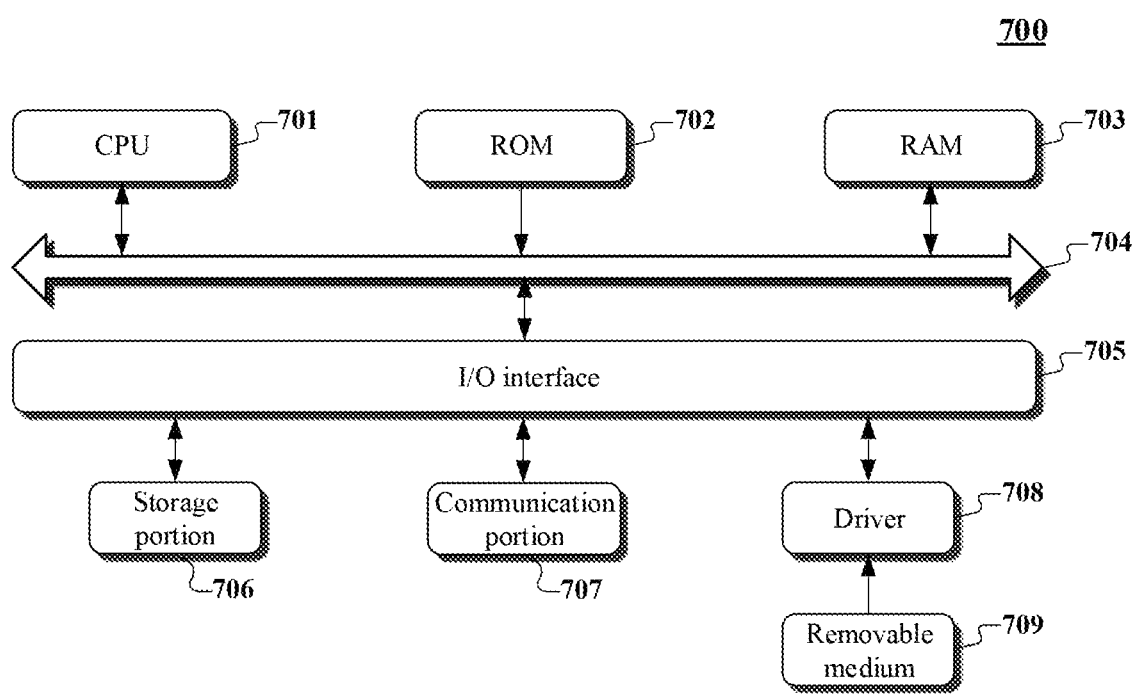
FIG. 7 is a schematic structural diagram of a computer system of a server adapted to implement the communication method for a virtual machine and a host machine according to the present disclosure.

Referring to FIG. 7, a schematic structural diagram of a computer system 700 of a server adapted to implement the communication method for a virtual machine and a host machine according to the embodiments of the present disclosure is shown. The server shown in FIG. 7 is merely an example, and should not limit the function and scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: a storage portion 706 including a hard disk and the like; and a communication portion 707 including a network interface card, such as a LAN card and a modem. The communication portion 707 performs communication processes via a network, such as the Internet. A driver 708 is also connected to the I/O interface 705 as required. A removable medium 709, such as a magnetic disk, an optical disk, a magneto-optical disk, and a semiconductor memory, may be installed on the driver 708, so that a computer program read therefrom is installed on the storage portion 706 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program includes program codes for executing the method as illustrated in the flow chart. In such an embodiment, the computer program may be downloaded and installed from a network via the communication portion 707, and/or may be installed from the removable media 709. The computer program, when executed by the CPU 701, implements the functions as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a polling unit, a determining unit, and an updating unit. Here, the names of these units do not in some cases constitute a limitation to such units themselves. For example, the polling unit may also be described as "a unit configured to poll a first command completion identifier queue set in a shared memory."

In another aspect, the present disclosure further provides a computer-readable medium. The computer-readable medium may be included in the apparatus in the above described embodiments, or a stand-alone computer-readable medium not assembled into the apparatus. The computer-readable medium stores one or more programs. The one or more programs, when executed by the apparatus, cause the apparatus to: poll a first command completion identifier queue set in a shared memory; compare, in response to detecting an update of the first command completion identifier queue, the first command completion identifier queue with a second command completion identifier queue stored in the virtual machine to determine an identifier of a currently completed command; and update the second command completion identifier queue based on the identifier of the currently completed command.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A communication method for a virtual machine and a host machine, the method comprising:
   polling a first command completion identifier queue set in a shared memory;
   comparing, in response to detecting an update of the first command completion identifier queue, the first command completion identifier queue with a second command completion identifier queue stored in the virtual machine to determine an identifier of a currently completed command; and
   updating the second command completion identifier queue based on the identifier of the currently completed command;
   wherein the method further comprises:
   sending a Input/Output (I/O) port read and write request to a to-be-executed command queue, and updating a to-be-executed command identifier queue corresponding to the to-be-executed command queue, causing the host machine polling the to-be-executed command identifier queue to obtain a current to-be-executed command, and to update the first command completion identifier queue after the current to-be-executed command is executed.

2. The method according to claim 1, the method further comprising:
   obtaining returned data corresponding to the currently completed command from a command queue based on the identifier of the currently completed command; and
   invoking a function to process the returned data.

3. A communication system for a virtual machine and a host machine, the system comprising: the host machine and at least one virtual machine deployed on the host machine, wherein:

the at least one virtual machine is configured to: poll a first command completion identifier queue set in a shared memory; compare, in response to detecting an update of the first command completion identifier queue, the first command completion identifier queue with a second command completion identifier queue stored in the virtual machine to determine an identifier of a currently completed command; and update the second command completion identifier queue based on the identifier of the currently completed command;

the at least one virtual machine is further configured to send a Input/Output (I/O) port read and write request to a to-be-executed command queue, and update a to-be-executed command identifier queue corresponding to the to-be-executed command queue; and the host machine is configured to: poll the to-be-executed command identifier queue in the shared memory to obtain a current to-be-executed command; and update the first command completion identifier queue after the current to-be-executed command is executed.

4. The system according to claim 3, wherein when the host machine updates the first command completion identifier queue, the host machine is further configured to:

poll the to-be-executed command identifier queue in the shared memory;

determine, in response to detecting an update of the to-be-executed command identifier queue, from the to-be-executed command queue the I/O port read and write request as the current to-be-executed command;

send the current to-be-executed command to a hardware device to cause the hardware device to execute the current to-be-executed command; and add, in response to receiving a command execution completion message returned by the hardware device, returned data of the current to-be-executed command to a command completion queue, and update the first command completion identifier queue.

5. The system according to claim 4, wherein the at least one virtual machine is further configured to:

obtain returned data corresponding to the currently completed command from a command queue based on the identifier of the currently completed command; and invoke a function to process the returned data.

6. A communication apparatus for a virtual machine and a host machine, the apparatus comprising:

at least one processor; and a memory storing instructions, wherein the instructions when executed by the at least one processor, cause the at least one processor to perform operations, the operations comprising:

polling a first command completion identifier queue set in a shared memory;

comparing, in response to detecting an update of the first command completion identifier queue, the first command completion identifier queue with a second command completion identifier queue stored in the virtual machine to determine an identifier of a currently completed command; and updating the second command completion identifier queue based on the identifier of the currently completed command;

wherein the operations further comprise:

sending a Input/Output (I/O) port read and write request to a to-be-executed command queue, and updating a to-be-executed command identifier queue corresponding to the to-be-executed command queue, causing the host machine polling the to-be-executed command identifier queue to obtain a current to-be-executed command, and to update the first command completion identifier queue after the current to-be-executed command is executed.

7. The apparatus according to claim 6, the operations further comprising:

obtaining returned data corresponding to the currently completed command from a command queue based on the identifier of the currently completed command; and invoking a function to process the returned data.

8. A non-transitory computer readable storage medium, storing a computer program thereon, the computer program, when executed by a processor, causes the process to implement the method according to claim 1.

9. The non-transitory computer readable storage medium according to claim 8, the method further comprising:

obtaining returned data corresponding to the currently completed command from a command queue based on the identifier of the currently completed command; and invoking a function to process the returned data.

* * * * *